United States Patent [19]
Boyce

[11] Patent Number: 4,833,175
[45] Date of Patent: May 23, 1989

[54] MIXING PROCESS

[75] Inventor: Gary W. Boyce, Mississauga, Canada

[73] Assignee: Polyvoltac Canada Inc., Mississauga, Canada

[21] Appl. No.: 222,471

[22] Filed: Jul. 21, 1988

[51] Int. Cl.$^4$ ............................ C08V 9/04; C08V 9/02
[52] U.S. Cl. .......................................... 521/82; 264/54; 264/DIG. 5; 422/133; 422/135; 521/131; 521/98; 521/99; 521/154; 521/917
[58] Field of Search ...................... 521/82, 131, 98, 99, 521/154, 917; 422/133, 135

[56] References Cited

U.S. PATENT DOCUMENTS

| | | | |
|---|---|---|---|
| 2,706,108 | 4/1955 | Miner | 259/8 |
| 2,816,741 | 12/1957 | Shuffman | 259/8 |
| 3,035,775 | 5/1962 | Edwards et al. | 239/142 |
| 3,393,260 | 7/1968 | Miler | 264/54 |
| 3,881,871 | 5/1975 | Porter | 23/252 R |
| 4,189,545 | 2/1980 | Modic | 521/131 |
| 4,302,550 | 11/1981 | Pisaric et al. | 521/133 |
| 4,311,802 | 1/1982 | Golser et al. | 521/133 |

Primary Examiner—Morton Foelak
Attorney, Agent, or Firm—Finnegan, Henderson, Farabow, Garrett & Dunner

[57] ABSTRACT

Viscous liquids containing polymeric materials which will interact with one another upon contact and generate gas for foam expansion are intimately and homogeneously mixed in a very short period of time by passing them successively and continuously through first and second rotary dynamic shearing mixers, the first mixer being considerably smaller than the second mixer, and the mixture experiencing a brief period of respite from shearing between the two mixers. The mixture experiences a much higher degree of shear in the first mixer, where the heat necessary for promoting the reaction is provided through the shearing action but without creating localized hot-spots. The process is particularly well suited for the preparation of foamed polydiorganosiloxanes, on a continuous, commercial scale.

8 Claims, 3 Drawing Sheets

MIXING PROCESS

FIELD OF THE INVENTION

This invention relates to mixing processes, and more particularly, to processes for mixing polymeric materials prior to their interaction to form cured foam products.

BACKGROUND OF THE INVENTION AND PRIOR ART

Polysilicone flexible foams are commonly made by the mixing together of mutually interreactive ingredients in the presence of a catalyst, with the gas evolved as a reaction product acting as the blowing agent. A typical example of such a formulation and process is described in U.S. Pat. No. 4,189,545 Modic. Such formulations contain two distinct parts, which are kept separate from one another until the foam is to be produced. The two parts react together relatively rapidly on contact, with the formation of high molecular weight polymer and generation of gas to cause foam expansion. The high molecular weight polymer then proceeds to gel and then to cure, all of these chemical and physical changes being capable of taking place at the mixing temperature (commonly room temperature), but preferably conducted at slightly elevated temperatures. The gelling process takes place rapidly, after which no further foam expansion can take place. It is quite common to include a retardant in the formulation for the specific purpose of prolonging the gel time, so that foam expansion may continue to its full extent. Curing is a slower process, and whilst it will occur naturally, at room temperature, after the gelling process is complete, it is common to warm the foam in an oven to complete the curing process.

Thus there take place, successively and rapidly following the contact of the reactive ingredients, the processes of chemical reaction, high molecular weight silicone polymer formation, gas generation, foam formation and expansion, and gelling. The quality of the end product foam, in terms of its open or closed cell nature, the size and uniformity of the cell structure, the density of the resulting foam and other properties, depends at least in part upon the homogeneity of the mixture at the time the foaming takes place, which in turn depends upon the thoroughness of the mixing of the components prior to foaming, and the maintenance of even temperature throughout the mixture.

However, the foamable composition ingredients are normally in the form of two dissimilarly viscous liquids and are not easily mixed into a sufficiently homogeneous composition before the chemical reaction to form the foam occurs. In the normal system, e.g. as disclosed in the aforementioned Modic Patent, the ingredients of the foamable composition are pre-combined into a part A and a part B, the constituents of each part being unreactive towards one another. In part A, there is a siloxane polymer, commonly a polydiorganosiloxane with vinyl terminal groups, filler, water and variable amounts of reactive diluent, plus a complex platinum based catalyst. In part B, there is a polydiorganosiloxane polymer containing hydride groups. Both parts are viscous liquids, although the problem is further complicated by the fact that one part is much more viscous than the other. Substantially immediately upon contact, the polymers and water react together under the influence of the catalyst, to generate hydrogen gas for blowing purposes and to form the high molecular weight polydiorganosiloxane curable to a high strength flexible foam material. Foaming occurs as the gas is released and expands. It is difficult to achieve the necessary homogeneous mixing of the ingredients to allow preparation of good quality homogeneous foam, along with even distribution of the fire retardant filler therethrough, in the time available before the mixture sets up and gels, especially on a commercial production scale. The time interval available for this mixing is at most about three minutes, and commonly as short as one minute or less. The reaction is sensitive to heat, and some heat should be supplied to achieve the best foams. However excessive provision of heat leads to uncontrollably fast reaction. Any heat should be supplied evenly and homogeneously to the reaction mixture, since the development of temperature inequities or hotspots in the reaction mixture will lead to inhomogeneous, poor quality foam. Heat primarily affects gas generation.

SUMMARY OF THE INVENTION

It is an object of the present invention to provide a novel mixing process for viscous liquid compositions, the liquids being capable of interaction upon contact to generate gases and create foam materials.

In the process of the present invention, two or more interreactable viscous polymer-containing liquids are contacted and thoroughly and homogeneously mixed together in a time interval of not more than three minutes, by passing them successively and continuously through first and second rotary dynamic shearing mixers, the first mixer being substantially smaller than the second mixer so that the mixture experiences much more severe mixing shearing conditions in the first mixer than in the second mixer, the mixture experiencing a period of non-shear conditions on passing from the first mixer to the second mixer. The viscous liquid mixture is fed into the first mixer where it is subjected to the mixing, shearing action of a perforated rotor-stator combination, and in which the polymeric ingredients of the mixture are subjected to high shear conditions. The mixture exits from the first mixer, to a non-shear zone, and thence to the substantially larger second mixer where it experiences much less severe mixing conditions. When it issues from the second mixer, less than three minutes after the initial contacting of the viscous liquids, the mixture is homogeneous and uniform, still a viscous liquid, but containing entrapped, generated gas and about to start to foam with the consequent pressure release on issue from the second mixer.

DESCRIPTION OF THE PREFERRED EMBODIMENTS

By arranging for the viscous, reacting mixture to have an initial period in which it experiences intense shear, followed by a brief non-shear "rest" period, followed by a final period in which it experiences mild shear, a very high quality final foam product indicative of achievement of a high degree of homogeneity of the mixture in the requisite short period of time is achieved. By far the larger amount of the heat required to promote the polymerization and foaming reaction in the mixture, at least 90% thereof, is provided by the mechanical shearing action in the first mixer. Within that mixer, however, the subdivision and recombination of the viscous mixture is so thorough, and occurs so rapidly and so frequently, that development of localized hot-spots is avoided. Thus all of the heat required to promote the reaction is provided by the mechanical action within the mixers. External or internal heating means, which inevitably lead to development of localized hot-spots, are unnecessary. Water jackets may be provided on the mixers, as an added safeguard for use in extreme environmental conditions.

The flow rate through the two mixers is preferably kept constant so that the speed of travel of the mixture through the larger second mixer, and the pressure experienced therein, is less than that through the smaller, first mixer. The two mixers are preferably of the same design, involving multiple mixing chambers with a perforated rotor acting in conjunction with a perforated stator to provide the necessary shearing action. The second mixer suitably has from about 1% to about 3% times the volumetric capacity of the first mixer. The smaller size of the first mixer leads to faster flow rates in the first mixer as compared with those in the second mixer, which leads to the experiencing of more severe shearing mixing conditions in the first mixer, during the continuous operation, and smaller heat input to the mixture in the second mixer.

The process as conducted in the first mixer can thus be viewed as aggressive mixing in which heat is generated in very localized, small quantities of the material as it is sheared, but recombination of the material takes place so rapidly thereafter that any such localized heat generation is promptly dissipated into the mixing mass. This heat generation is homogeneously spread throughout the mass, and has a beneficial effect on gas generation throughout the mixing mass. After this aggressive heat generation, the mixture is recombined in a mass, allowed a rest period, and then subjected to mild shearing in the second mixer, to complete the homogenization and allow the foaming reaction to proceed smoothly.

In the rest period, the direction of flow of the mass is preferably turned, e.g. from horizontal to vertical. The direction of flow on entering the second mixer is preferably turned once again, e.g. by providing the second mixer in a horizontal disposition, as with the first mixer, but with its axis of rotation at from about 60° to about 120° thereto. Such changes of predominant direction of flow are believed to interrupt the effect of Coriolis forces which develop in the first rotary mixer and tend to create minor cavitations in the mixture and hence inhibit mixing. By turning the predominant direction of flow, these effects are interrupted and reversed. The conditions in the second mixer are milder so that such problems do not arise therein. The preferred change in flow direction between the first mixer and the second mixer is from about 60° to about 120°, and the optimum is a right angle 90° change.

Preferably, the first and second mixers are disposed vertically one above the other, and are of generally similar types. The two liquids are brought into contact immediately upstream of the entrance to the first mixer, and force pumped into it. Then the mixture can be forced downwardly into the second mixer under the influence of the pressure applied on pumping the mixture into the first mixer, through a vertically extending zone in which the mixture experiences no shear. As it issues from the second mixer, it is about to start to foam, and the mixture can be poured into molds where its foam expansion takes place until it has fully gelled. Slabs or other shapes of flexible foamed polysiloxane polymers are thus obtained for curing.

When curable, solidifiable liquid mixtures are being prepared by the process of the present invention, such as the aforementioned foamable curable liquid polydiorganosiloxane compositions, overall temperature controls as well as throughput speed and homogeneous mixing and avoidance of localized hot-spots is important. If the mixture solidifies within the mixing equipment, the entire process must be interrupted for cleaning purposes—an extremely costly event when the process is being run continuously on a commercial production scale. Temperatures in excess of about 40° C. should be avoided. Otherwise, the foaming process takes place too rapidly and is not properly controllable, with the result that an inhomogeneous foam product is obtained, and there is a risk of premature curing. The mixing-shearing action especially of the first mixer can cause substantial rises in temperature of the mixture. Nevertheless, an excessively cold mixture of ingredients entering the first mixer will have an excessively high viscosity, rendering it even more difficult to mix thoroughly in the short times available before gelling.

Accordingly, the ingredients preferably enter the first mixer at temperatures in the approximate range 15°-25° C., and a constant continuous overall rate of throughput is maintained. Thus the first mixer is run at constant speed, and the second, larger mixer is run at a speed lower than that of the first mixer, the speeds being chosen so as to ensure that the mixed product issuing from the second mixer has a temperature not greater than 40° C.. The speeds of the two mixers are thus chosen to ensure throughput of the material within the necessary time interval (maximum three minutes, preferred less than 1½ minutes, optimum 30-45 seconds), and a temperature rise of the product mixture to 40° C. or lower, with the adjustments as the process continues being made by adjusting the speed of the second mixer.

To provide further enhancement of the mixing process, it is preferred initially to introduce the second liquid component into a flowing stream of the first liquid component, immediately upstream of the first mixer, through the intermediary of a perforated distributor. Such a distributor preferably comprises a perforated pipe, with perforations for passage of the second liquid component therethrough, sealingly protruding into the larger pipe which conveys the first liquid. The perforated pipe has perforations spaced apart both axially and circumferentially, so that the second liquid issuing therefrom is fed into the first liquid stream in a variety of different directions including upstream and downstream directions. This assists in preliminary dispersion of the second liquid within the first liquid, prior to subjecting it to shearing mixing.

BRIEF REFERENCE TO THE DRAWINGS

Specific preferred embodiments of the invention are illustrated in the accompanying diagrammatic drawings, in which FIG. 1 is a diagrammatic process flow sheet of a process according to the present intention;

DETAILED DESCRIPTION OF THE SPECIFIC PREFERRED EMBODIMENT

Figure 1:
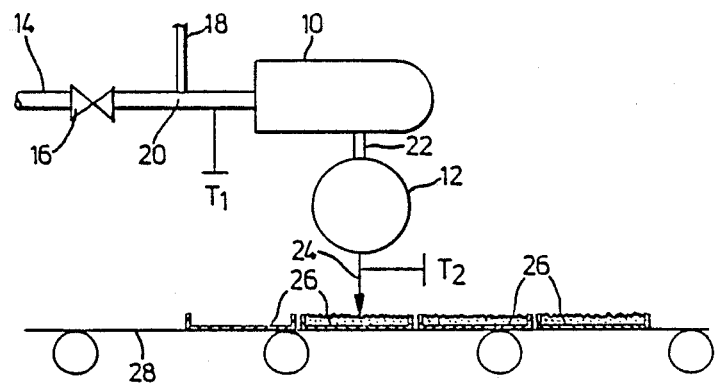

With reference to FIG. 1 of the accompanying drawings, the process of the invention utilizes a first rotary dynamic forced shear mixer 10 and a second similar rotary dynamic forced shear mixer 12. The two mixers are of essentially similar design, being basically "Multi-frequency Fluid Mixers" obtainable from Bran and Lubbe (G.B.) Ltd., Brixworth, Northamptonshire, England, with certain modifications. The second mixer 12 is substantially larger than the first mixer 10, but is essentially the same in terms of structure and operation. Each has three mixing chambers. The second mixer is disposed at right angles to, and directly below, the first mixer 10. The volumetric ratio of the second mixer 12 to the first mixer 10 is 2½.

One viscous liquid to be mixed is delivered via inlet line 14 and flow control valve 16. The second viscous liquid is delivered via line 18 to contact the first liquid at location 20. A temperature probe $T_1$ is located just downstream of location 20 to sense the temperature of the liquids immediately prior to their entry into first mixer 10. This temperature is satisfactorily between 15° C. and 25° C. when the viscous liquids contain polydiorganosiloxane polymers and foaming and curing systems therefor, in accordance with the most preferred embodiment of the invention. The mixture moves axially of the axis of rotation of the rotator shaft of the mixer 10 via a tortuous path involving shearing, stream subdivision and recombination as described below. The liquids are force pumped into mixer 10, e.g. at a pressure of 80-160 psi. From the outlet of first mixer 10, the mixture is then forced downwardly via outlet pipe 22 directly to second mixer 12 where it is similarly mixed again. During its vertical passage through pipe 22, between the two forced shear mixers, the mixture experiences a period of relative rest. It is fed out of second mixer 12 via applicator line 24 which reciprocates to deposit the mixed composition, now starting to foam, evenly into shallow trays 26 supported on a conveyor 28. The composition foams in the trays 26 to form foam slabs of the desired thickness. A temperature sensor $T_2$ is provided in line 24, the readings from which are used to adjust the mixing speed in second mixer 12 and thus ensure that the temperature does not exceed 40° C. at the outlet. When preparing silicone foams as previously described, a high degree of homogeneity in the mixture issuing from applicator line 24 must be achieved, the outlet temperature should not exceed 40° C., and the time taken for the mixture to move from location 20 to the outlet from applicator line 24 must not exceed three minutes and should preferably take less than one minute.

Figure 2:
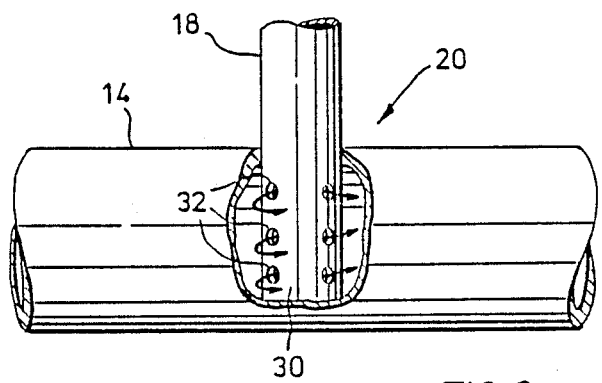
FIG. 2 is a diagrammatic view of the means of initial dispersion of the second liquid within the first liquid prior to their mixing.

As diagrammatically illustrated in FIG. 2, the contacting of the two liquids at location 20 utilizes a distributor head 30 disposed inside line 14 and forming the end portion of line 18. The distributor head 30 has perforations 32 therein, provided in vertical rows at 90° to one another to face both upstream and downstream at angles to the flow direction of liquid in line 14 so that the second liquid is initially distributed within a large portion of the bulk of flowing liquid in line 14.

Figure 3:
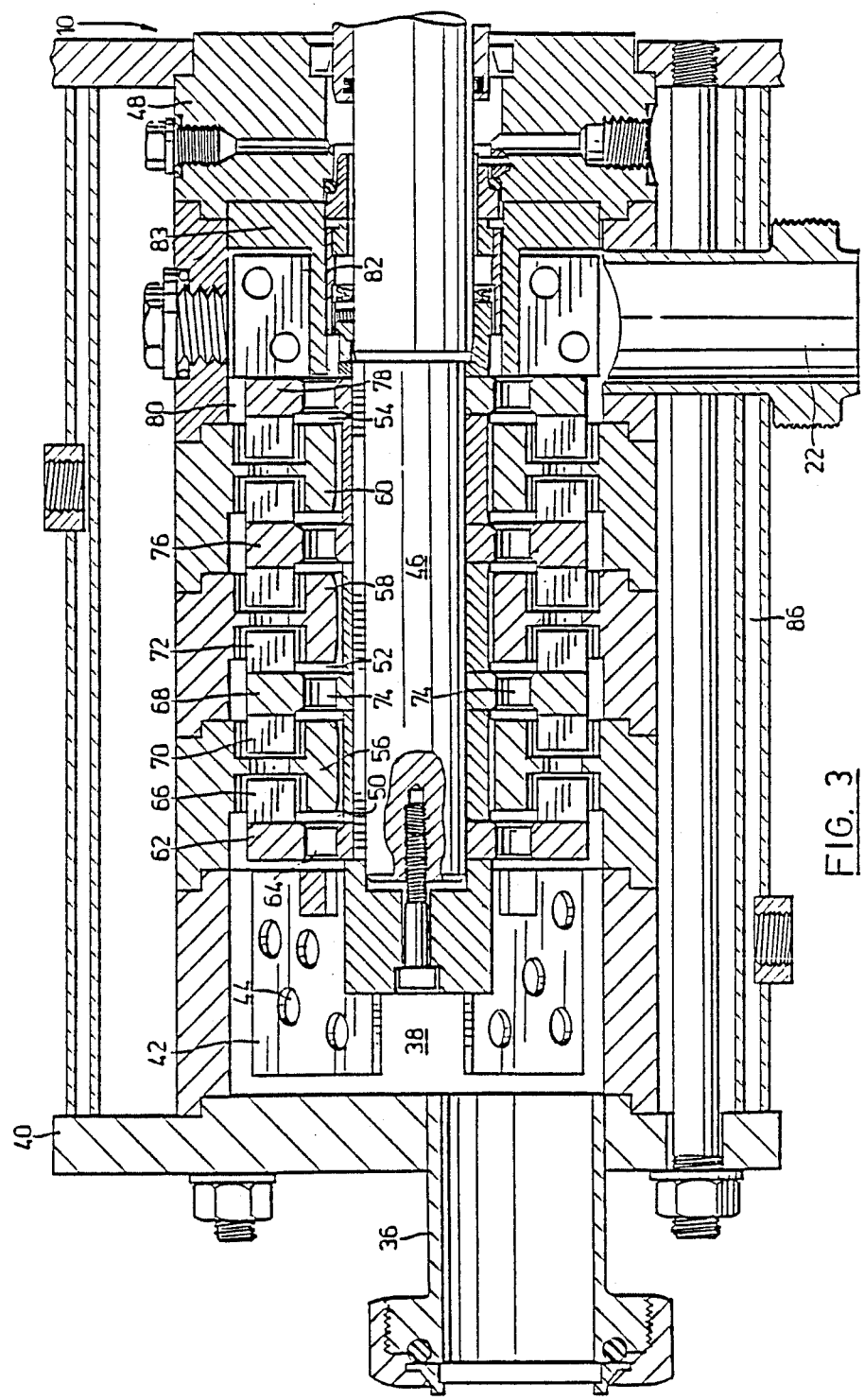
FIG. 3 is a vertical part-section through a portion of the first mixer employed in a process according to the invention.
Figure 4:
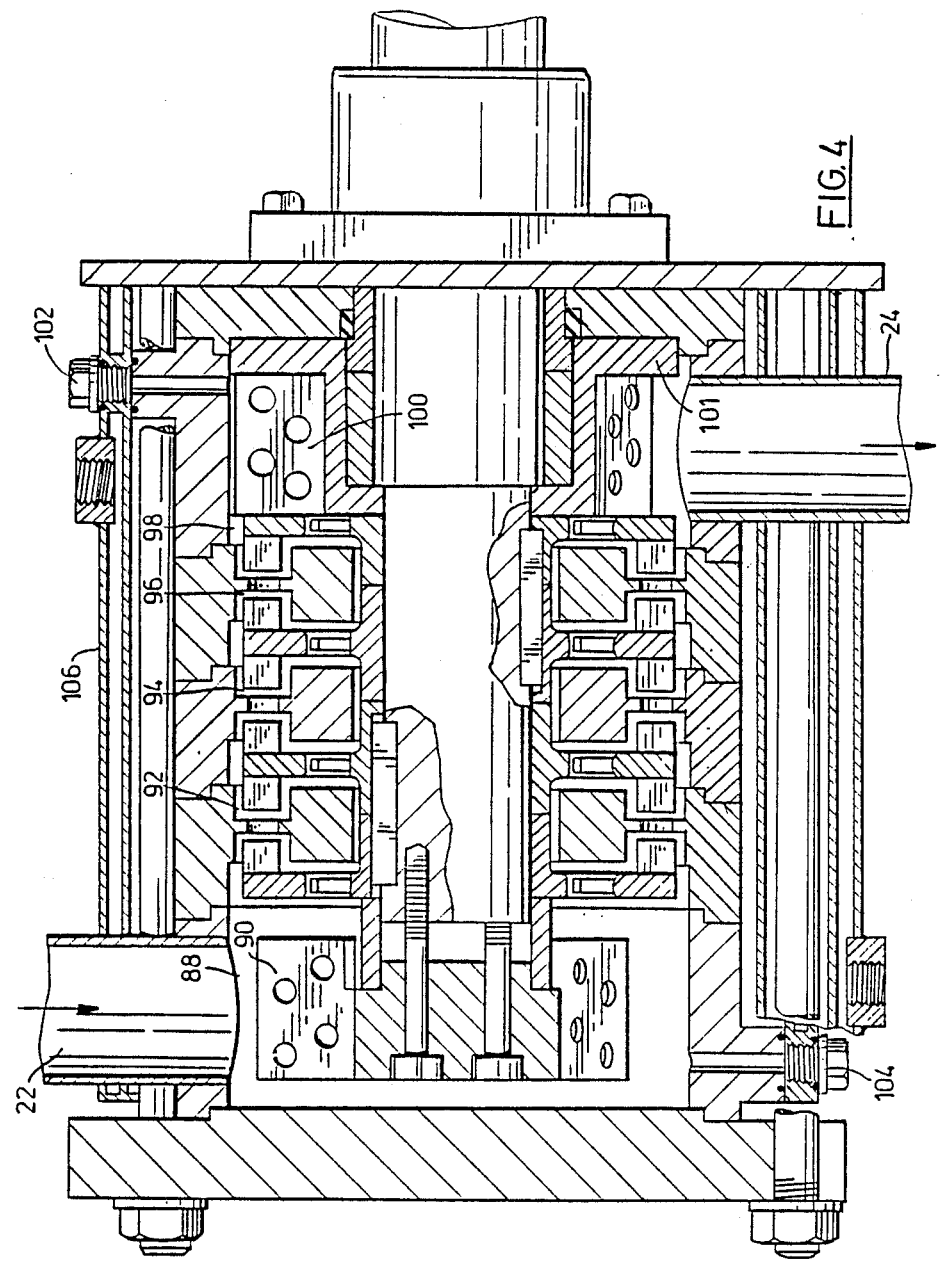
FIG. 4 is a similar vertical part-section through a portion of the second mixer so employed.

Referring now to FIG. 3, this shows in partially cut away vertical section the first forced shear mixer 10. Liquids enter via horizontal inlet pipe 36, into an entrance chamber 38 bounded at one end with an end plate 40. Paddles 42 with perforations 44 in their blades are disposed in entrance chamber 38 and secured to rotatable shaft 46 which extends through the mixer and is driven for rotation by means disposed beyond the downstream end housing 48 (not shown).

The mixer comprises three mixing chambers 50, 52 and 54, each containing its respective stator 56, 58, 60, secured to the body of the mixer. The chambers are separated by rotors secured to the rotatable shaft 46. The first rotor 62 separates the entrance chamber 38 from the first mixing chamber 50. This rotor 62 is of disk-like form, with a plurality of perforations 64 therethrough, arranged in a circular pattern. At its periphery, it is provided with a series of axially extending flat vanes 66, protruding downstream into the chamber 50. The second rotor 68, separating first and second mixing chambers 50 and 52, is similarly constructed, but with vanes 70 and 72 protruding respectively into the first and second mixing chambers. It is similarly provided with a circular array of perforations 74, providing communication between the first and second mixing chambers. The third rotor 76 is the same as the second rotor 68 in all respects. The fourth rotor 78 is similar in all respects to first rotor 62, except that its vanes protrude upstream. An exit chamber 80 with perforated rotary paddles 82 is provided immediately downstream of fourth rotor 78. The exit chamber 80 communicates with outlet pipe 22 which communicates with the second mixer. A plugged flush opening 84 is provided through the housing to communicate with chamber 80. This can be opened between runs, to introduce flushing liquids to clean the machine. The flushing liquid can flow from opening 84 to exit via inlet pipe 36, or vice versa. A cylindrical collar 83 fits inside rotary paddles 82 in exit chamber 80, to reduce dead-space therein. Collar 83 protrudes upstream to chamber 80 and is attached to the end housing 48.

A water jacket 86 with appropriate plugged inlets and outlets surrounds the mixer 10 cylindrically. It is normally filled with water at about 20° C. It only comes into play when very high environmental temperatures are experienced, exteriorly of mixer 10.

Thus viscous liquid force pumped into the mixer through inlet pipe 36 is first agitated in the entrance chamber 38 by the rotating paddles 42, and then proceeds through the perforations 64 in the first rotor 62 into the first mixing chamber 50, as the rotor 62 rotates. The perforations 64 cause subdivision of the liquid material as it passes through the rotor, and the vanes 66 in combination with the stator 56 provide a high degree of shearing action as well as mixing action to the material. Next, the material moves through the perforations 57 in the stator 56 to encounter the action of the second rotor 68. The material moves through the perforations 74 in the second rotor, into the second mixing chamber 52, then through the perforations in the second stator 58, through the perforations in the third rotor 76 into the third mixing chamber 54. The material moves out of the third mixing chamber 54 through the perforations in the fourth rotor 78, into the exit chamber 80, in which it is kept under agitation by means of the perforated blades 82. Then it exits via exit line 22 to the similarly arranged, larger second mixer 12 which is, however, mounted with its axis of rotation at right angles to that of the first mixer 10.

The second mixer 12 is essentially similar in construction and operation to the first mixer 10 just described.

Thus it has an entrance chamber 88 equipped with a rotating perforated paddle 90, and three serially arranged mixing chambers 92, 94, 96 each equipped with respective perforated rotors and stators. There is a downstream exit chamber 98 containing a perforated paddle 100, from which the mixture exits downwardly through outlet 24. A collar 101 fits inside paddle 100 and limits dead space in chamber 98. Plugged flush openings 102, 104 are provided respectively above the exit chamber 98 and through the entrance chamber 88, for cleaning the apparatus between runs. A water jacket 106 cylindrically surrounds the mixing chambers.

Thus in each mixer, the liquid material follows a tortuous path through the various mixing chambers, and is subjected to shearing action by the rotors and stators defining the mixing chambers. The stream is subdivided many times by means of the perforations in the rotors and stators, and finally recombined in the exit chamber 80 and outlet pipe 22, where it experiences a shear-free pause as its direction of flow is changed to vertical. Then, its predominant direction of flow is turned through 90° to proceed similarly through the second mixer.

As it passes through the first mixer 10, the viscous liquid mixture is subjected to relatively violent shearing action, with continual subdivision and recombination of the material. The clearances between rotor and stator are small. The perforation sizes are also relatively small. Accordingly, heat is generated as the material is subdivided and sheared, but the individual subdivided portions which might otherwise become overheated as a result are immediately recombined with the mass of material as they issue from the various perforations. As a result, the heat generated by the rotary shearing action is dissipated throughout the bulk of the mixture. The overall temperature rises as a result, to enhance gas generation, but it does so evenly throughout the mixture, and the temperature is controlled not to exceed 40° C.. Temperature is monitored at $T_2$, in the exit 24 from the second mixer 12, and is normally controlled to be about 32° C., by adjustment of the rotational speed of the shaft in second mixer 12.

The result is a highly homogeneous viscous liquid mixture, achieved in a time interval of as little as 45 seconds, from initial contact of the liquid components at location 20, to exit from the second mixer through exit line 24. In this time interval, gelling of the polydiorganosiloxane product has not started, to any significant extent, and so the mixture can undergo foam expansion to its full extent, after issuing from the mixers. The gas generated by the chemical reactions as the ingredients are mixed in the mixers is released as the mixture encounters atmospheric pressures on issuing from the second mixer. It can thus cause the foam expansion as the material is poured into the molds 26 to the extent desired, without encountering undue resistance from the gelled product. The high degree of homogeneity achieved by the process leads to highly homogeneous, good quality closed cell foams.

It will be apparent to those skilled in the art that modifications and adjustments to the process as illustrated can be made, without departing from the scope of the invention. The precise embodiment of the invention described and illustrated in detail herein is not to be considered as limiting. The scope of the invention is defined in the appended claims.

I claim:

1. A process for the rapid preparation of a substantially homogeneous mixture of at least two viscous liquids containing interractable polydiorganosiloxanes and an appropriate catalyst system for generation of gas on interreaction thereof to cause foam expansion and rapid gelling of the mixture at room temperatures which comprises:

bringing said liquids into initial mutual contact;

continuously passing said mutually contacting liquids through a first, relatively small, rotary dynamic shearing mixer and subjecting said liquids to a high degree of rotary shearing agitation and mixing therein, with subdivision and recombination of portions of the mixture to dissipate localized heat generation substantially evenly throughout the bulk of the mixture;

continuously delivering the mixed liquids from the first mixer to a rest zone through which the mixture moves without experiencing significant shear conditions;

continuously delivering the mixed liquids from the rest zone to a second, relatively large, rotary dynamic shearing mixer and subjecting said liquid to a mild degree of rotary shearing agitation and mixing therein;

and recovering a substantially homogeneous mixture of polydiorganosiloxanes and reaction product thereof from said second mixer;

the time interval between said initial mutual contact and said recovering being not greater than about 3 minutes.

2. The process of claim 1 wherein the temperature of initial contact of liquids is from about 15°–25° C. and the temperature of the mixture upon recovery is not greater than 40° C..

3. The process of claim 2 wherein each of the first and second mixers is a multi-chamber dynamic rotary mixer, in which each chamber contains a perforated rotor and a perforated stator assembly, so that liquids being mixed therein follow a tortuous path around and through the rotor and stator as they pursue their predominant direction of flow parallel to the axis of rotation.

4. The process of claim 3 wherein the second mixer has from about 1½ to about 3½ times the volumetric capacity of the first mixer.

5. The process of claim 4 wherein the second mixer is disposed with its axis of rotation at an angle of about 60°–120° to that of the first mixer.

6. The process of claim 5 wherein the first mixer is disposed vertically above the second mixer, and the rest zone comprises a vertical delivery conduit extending between the first and second mixers.

7. The process of claim 6 wherein the first mixer is operated at constant speed and the second mixer speed is varied so as to control the temperature of the mixture issuing from the second mixer.

8. The process of claim 7 wherein one of said polymer polydiorganosiloxane containing viscous liquids is initially contacted with another thereof by introducing it into a flowing stream of said other liquid immediately upstream of said first mixer, through a perforated distributor having perforations directing said one liquid in both the upstream and downstream direction of flow of said other liquid.

* * * * *

UNITED STATES PATENT AND TRADEMARK OFFICE
CERTIFICATE OF CORRECTION

PATENT NO. : 4,833,175

DATED : May 23, 1989

INVENTOR(S) : Gary W. Boyce

It is certified that error appears in the above-identified patent and that said Letters Patent is hereby corrected as shown below:

Claim 8, col. 8, line 58: delete "polymer"

Signed and Sealed this

Twenty-seventh Day of February, 1990

Attest:

JEFFREY M. SAMUELS

*Attesting Officer*  *Acting Commissioner of Patents and Trademarks*